(12) United States Patent
Sarab

(10) Patent No.: US 8,757,372 B2
(45) Date of Patent: Jun. 24, 2014

(54) PROTECTIVE ENVELOPE FOR CD, DVD, OTHER DISC MEDIA, OR OTHER DISCS

(76) Inventor: Greg Sarab, Half Moon Bay, CA (US)

( * ) Notice: Subject to any disclaimer, the term of this patent is extended or adjusted under 35 U.S.C. 154(b) by 0 days.

(21) Appl. No.: 13/556,173

(22) Filed: Jul. 23, 2012

(65) Prior Publication Data

US 2013/0186789 A1    Jul. 25, 2013

Related U.S. Application Data

(60) Provisional application No. 61/511,024, filed on Jul. 23, 2011.

(51) Int. Cl.
*B65D 85/30* (2006.01)
*B31B 1/26* (2006.01)

(52) U.S. Cl.
USPC .................. 206/308.1; 493/243; 493/244

(58) Field of Classification Search
USPC ............ 206/308.1, 311, 800, 525.1; 493/243, 493/244, 246; 53/460; 229/87.01, 72, 87.2, 229/87.07, 400, 68.1, 75
See application file for complete search history.

(56) References Cited

U.S. PATENT DOCUMENTS

| | | | | | |
|---|---|---|---|---|---|
| 1,023,998 | A | * | 4/1912 | Ellsworth | 229/400 |
| 1,042,824 | A | * | 10/1912 | Richardson | 229/400 |
| 1,294,481 | A | * | 2/1919 | Kopec | 229/75 |
| 6,612,433 | B2 | * | 9/2003 | McKenzie | 206/308.1 |
| 2006/0283922 | A1 | * | 12/2006 | Hurwitz | 229/68.1 |
| 2009/0008435 | A1 | * | 1/2009 | Vukotic | 229/72 |

FOREIGN PATENT DOCUMENTS

JP    3158622 U    *    4/2010

OTHER PUBLICATIONS

Lang, Robert J. "Origami Zoo: An Amazing Collection of Folded Paper Animals," Jun. 15, 1990, Macmillan Publisher, 165 pages. (Review only).
Lang, Robert J. "The Complete Book of Origami," 1988, Dover Publications, 160 pages. (Review only).
Beech, Rich, "Origami You Can Use: 27 Practical Projects," Jun. 22, 2009, Courier Dover Publications, 96 pages.

* cited by examiner

*Primary Examiner* — Anthony Stashick
*Assistant Examiner* — James Way
(74) *Attorney, Agent, or Firm* — Jeffrey D. Frazier

(57) ABSTRACT

Disclosed are embodiments of a folded paper CD/DVD case. The case can be biodegradable, and uses reduced or minimal material. The case can be made without the use of cuts or glue, nor does the case require special equipment or machinery to manufacture. The case can hold plural media such as, e.g., two CDs or DVDs. The footprint of the case can be reduced or minimal, that is, e.g., only minimally larger than one or more CDs or DVDs it will hold. The case can have a pentagonal or pentagon-like shape.

12 Claims, 1 Drawing Sheet

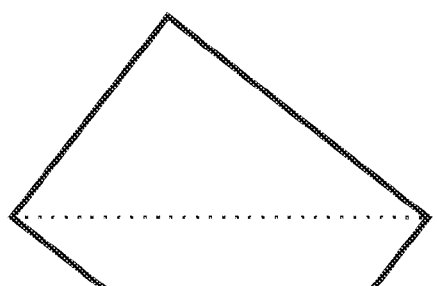
1
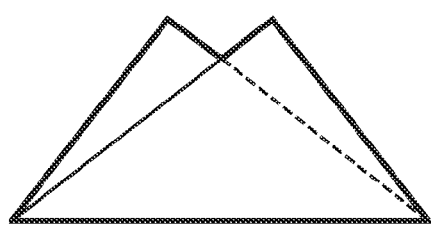
2
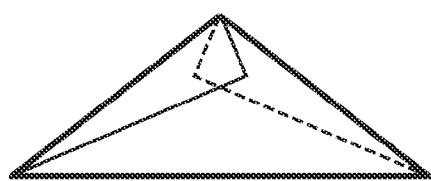
3
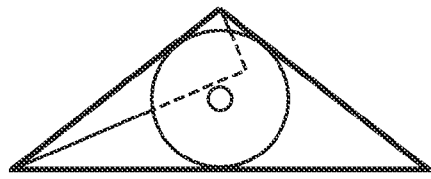
4
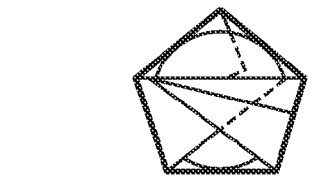
5
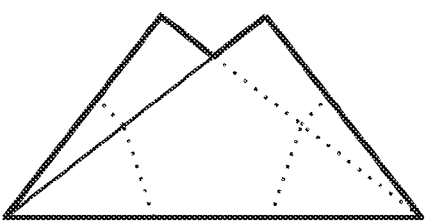
6
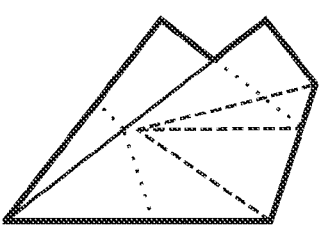
7
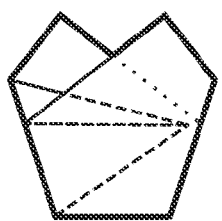
8
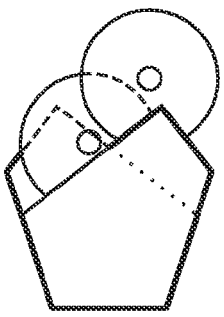
9
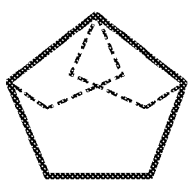
10

PROTECTIVE ENVELOPE FOR CD, DVD, OTHER DISC MEDIA, OR OTHER DISCS

RELATED APPLICATIONS

This application claims priority to and benefit of U.S. Provisional Application Ser. No. 61/511,024, entitled "Protective Envelope for CD, DVD, Other Disc Media, or Other Discs," filed Jul. 23, 2011.

FIELD OF INVENTION

The present teachings relate to cases, sleeves, envelopes, and the like, for CD, DVD, other disc media, and/or other discs.

BACKGROUND OF THE INVENTION

Many cases, sleeves, holders, envelopes, or the like, (herein, collectively, "cases" or "holders") for CD, DVD, other disc media, other discs, or the like Ce.g., Blu-ray discs), (herein, collectively, "discs," "disc media," or "media") are made of plastic and/or cardboard materials. Typical configurations use more material than is necessary. Also, they typically require the use of special manufacturing facilities, equipment, and machinery. Unfortunately, many such cases eventually break after heavy usage or mishandling, and often end up in landfills.

Some folded-paper cases have been proposed, however they generally require cuts and/or adhesives. Most are designed to hold no more than one CD or DVD at a time.

There is a need for a folded-paper case that is biodegradable and uses minimal material. As well, there is a need for such a case that can be made requiring neither cuts or glue, nor special equipment or machinery to manufacture. Further, there is a need for such a case that can hold plural disc media or other discs, such as two CDs or DVDs. Ideally, the footprint of the case would be minimal; e.g., only minimally larger than a CD or DVD it will hold.

BRIEF SUMMARY OF THE INVENTION

Various aspects of the present teachings relate to a process for making a protective holder for one or more CD and/or DVD media, including any other similar media such as Blu-ray discs.

In various embodiments, the process can comprise, for example:
1. A standard rectangular sheet of paper or card stock is folded along the diagonal from corner to corner and creased.
2. The protruding flaps are folded over the opposing edge and creased.
3. A CD or similar-sized disk is centered on the resulting triangular shape to facilitate estimation of the location of the next fold. Alternately, the paper may be pre-marked to show the location of the next fold, or it may be "eyeballed".
4. The narrow ends of the triangular shape are folded across the disk, or follow a marking, or by careful estimation, to create a shape that is very nearly a regular pentagon and the folds are creased. The top edges of these narrow ends are nearly flush where they overlap across the center of the pentagon.
5. The shape is unfolded as far as the first crease, which remains.
6. The narrow ends of the triangular shape are inverted by means of what may be referred to in the practice of origami as a_valley fold" so that they become located inside the main shape, with the bottom creases of the narrow ends becoming folded and creased in the opposite direction. This recreates the pentagon shape with the addition of two partial flaps extending to the top of the shape, plus two chambers or pockets almost entirely separated by a layer of paper inside the main shape.
7. One disk may be inserted into each pocket.
8. The top flaps are folded over and tucked into the main shape, trapping the disk/s inside.

Various embodiments relate to a product produced by the method as set forth above. In a variety of embodiments, the product is monolithic. In various embodiments, the product is made from no more than a single sheet of paper. According to a variety of embodiments, the single sheet of paper has a width of 8 ½ inches and a length of 11 inches. In various embodiments, the product is devoid of any cut, slit, glue, adhesive, perforation, hole, tear, or any combination thereof. In accordance with various embodiments, the product can comprise a single, folded sheet of paper; wherein the folded sheet of paper defines two generally planar pockets disposed in side-by-side relation; and further wherein the folded sheet of paper has a generally pentagon shape.

Further aspects of the present teachings relate to a case or sleeve for disk-shaped objects such as a CDs or DVDs, comprising a single, folded sheet of paper; wherein the folded sheet of paper defines two generally planar pockets disposed in side-by-side relation; and further wherein the folded sheet of paper has a generally pentagon shape.

According to various embodiments, the pockets are substantially parallel to one another. In various embodiments, each of the pockets is configured to receive a CD or DVD. In a variety of embodiments, a CD or DVD is held within each of the two pockets; with the case or sleeve further comprising a divider separating, at least in part, each CD or DVD from the other. According to a variety of embodiments, a ratio of the surface area of a CD or DVD held within the case or sleeve to the surface area of the pentagon shape of the case or sleeve is about I:1.2. In various embodiments, the paper comprising the case or sleeve is comprised of one or more biodegradable materials.

Further aspects of the present teachings relate to a case or sleeve for disk-shaped objects such as CDs or DVDs, comprising: a single, folded sheet of paper; wherein said folded sheet of paper has a generally pentagon shape comprising a plurality of edges, wherein all the edges are folds or securely tucked flaps.

BRIEF DESCRIPTIONS OF DRAWINGS

FIG. 1 depicts a method for producing a case according to various embodiments of the invention, as well as a product produced by the method.

DETAILED DESCRIPTION OF THE INVENTION

Various non-limiting, exemplary embodiments will now be described.

According to various embodiments, and with reference to FIG. 1, a case for holding at least two CDs or DVDs can be constructed as follows:
1. A standard letter size sheet of paper or card stock is folded along the diagonal from corner to corner and creased.

2. The protruding flaps are folded over the opposing edge and creased.
3. A CD or similar-sized disk is centered on the resulting triangular shape to facilitate estimation of the location of the next fold. Alternately, the paper may be pre-marked to show the location of the next fold, or it may be "eyeballed".
4. The narrow ends of the triangular shape are folded across the disk, or follow a marking, or by careful estimation, to create a shape that is very nearly a regular pentagon and the folds are creased. The top edges of these narrow ends are nearly flush where they overlap across the center of the pentagon.
5. The shape is unfolded as far as the first crease, which remains.
6. The narrow ends of the triangular shape are inverted by means of what may be referred to in the practice of origami as a "valley fold" so that they become located inside the main shape, with the bottom creases of the narrow ends becoming folded and creased in the opposite direction. This recreates the pentagon shape with the addition of two partial naps extending to the top of the shape, plus two chambers or pockets almost entirely separated by a layer of paper inside the main shape.
7. One disk may be inserted into each pocket.
8. The top flaps are folded over and tucked into the main shape, trapping the disk/s inside.

Alternate folds may be employed to achieve the same basic shape (i.e., pentagon); e.g., for the flaps. The product produced by the process described above has a pleasing near-perfect-pentagon shape, and readily fits a standard 5-¼-inch CD/DVD. A feature of this design is all the edges are folds or securely tucked flaps. Additionally, the paper layer acting as a divider makes it especially suitable for disk packaging (eg., holding two disks, separated and protected from one another by the divider). As further discussed below, while US-standard 8-½ inch by 11 inch paper is demonstrated, European-size A4 paper or other similarly proportioned paper including custom sizes and proportions may be employed.

The cases and sleeves, and methods for making the same, of the present teachings, can be scaled up for other objects, such as for a regular vinyl LP or 45 rpm disc; or scaled down for other objects, such as for a mini-CD/DVD. It should be appreciated that the teachings herein can be adapted for most any size disk. Standard-sized paper (8-½ inches by 11 inches) may be preferred in many instances, according to various embodiments, due to its ready availability and the fact that the folding techniques taught herein and ultimate configuration of the product, are extremely well suited for standard-sized CDs and DVDs (5-¼ inches). However, it is relatively straightforward to use other standard sizes of paper or to have paper cut to other standard or non-standard sizes, and so the present teachings extend beyond the use of standard letter-sized (8-½ inches×11 inches) paper. Both standard letter-sized paper and paper of other standard or non-standard sizes are contemplated herein, as when employed in accordance with the present teachings, the need/use for special cuts, perforations, tabs, gluing, and the like, is unnecessary; any and all of which can otherwise introduce undesirable complexities and complications.

The area of a CD/DVD is approximately 17.5 square inches, while in various embodiments, the area of a pentagon circumscribing a CD/DVD is approximately 20.8 square inches, for a ratio of approximately 1:1.2. In some embodiments, the ratio of the surface area of the CD/DVD to the surface area of the pentagon sleeve shape can be within a range from less than 1:1.1 to more than 1:1.3, as various embodiments contemplate tolerances of +/−5% to +/−10% or more.

Each reference cited herein is incorporated herein by reference in its entirety for all purposes.

While the principles of the present teachings have been illustrated in relation to various exemplary embodiments shown and described herein, the principles of the present teachings are not limited thereto and include any modifications, alternatives, variations and/or equivalents thereof.

What is claimed is:

1. A process for making a pentagonal envelope, container or protective holder, comprising:
   folding a rectangular sheet along a diagonal from corner to corner and creating a first crease, thereby producing a two-layer triangular shape with two single-layer protruding flaps;
   folding and creasing the protruding flaps over their opposing edges, leaving only the triangular shape comprising a central area, two acute angled corners and one obtuse angled corner;
   a step for determining a location of the next folds;
   folding the acute angled corners of the triangular shape across the central area of the triangular shape creating a pentagon shape;
   unfolding the pentagon shape as far as the first crease, which remains folded with plainly visible unfolded creases from the steps subsequent to the first crease;
   opening the triangular shape;
   inverting the acute angled corners of the triangular shape by a fold along portions of the unfolded crease lines created in forming the triangular shape that were folded across the central area of the triangular shape, so that they become located inside the triangular shape, with a portion of the first crease proximate to each acute angled corner becoming folded and creased in the opposite direction; thereby recreating the pentagon shape, plus creating two partial flaps extending from the top of the pentagon shape, plus two chambers or pockets almost entirely separated by a layer of paper inside the main shape;
   closing the pentagon shape; and
   folding the top flaps over and tucking them into the pentagonal shape, thereby creating an enclosure.

2. A product produced by the method of claim 1.

3. The product of claim 2, wherein said product is monolithic.

4. The product of claim 2, wherein said product is made from no more than a single sheet of paper.

5. The product of claim 4, wherein said single sheet of paper has a width of 8 ½ inches and a length of 11 inches.

6. The product of claim 4, wherein said product is devoid of any cut, slit, glue, adhesive, perforation, hole, tear, or any combination thereof.

7. The product of claim 2, wherein said sheet comprises paper or card stock.

8. A process for making a pentagonal, self-closing enclosure, comprising:
   folding a rectangular sheet along a diagonal from corner to corner and creating a first crease, thereby producing a two-layer triangular shape with two single-layer protruding flaps;
   folding and creasing the protruding flaps over their opposing edges, leaving only the triangular shape comprising a central area, two acute angled corners and one obtuse angled corner;
   a step for determining a location of the next folds;

folding the acute angled corners of the triangular shape across the central area of the triangular shape creating a pentagon shape;

unfolding the pentagon shape as far as the first crease, which remains folded, with plainly visible unfolded creases from the steps subsequent to the first crease;

opening the triangular shape;

inverting the acute angled corners of the triangular shape by a fold along portions of the unfolded crease lines created in forming the triangular shape that was folded across the central area of the triangular shape, so that they become located inside the triangular shape, with a portion of the first crease at each acute angled corner becoming folded and creased in the opposite direction; thereby recreating the pentagon shape, plus creating two partial flaps extending from the top of the pentagon shape, plus two chambers or pockets almost entirely separated by a layer of paper inside the main shape; and closing the pentagon shape; and folding the top flaps over and tucking them into the pentagonal shape, thereby creating an enclosure.

9. The process of claim 8, wherein said step for determining the location of the next fold comprises centering a CD or similar-sized disc on the triangular shape and estimating the location of the next fold.

10. The process of claim 8, wherein said sheet is pre-marked, and wherein said step for determining the location of the next fold comprises ascertaining a marking that designates the location of the next fold.

11. The process of claim 8, wherein said step for determining the location of the next fold comprises looking at the triangular shape and estimating the location of the next fold.

12. The process of claim 8, wherein said sheet comprises paper or card stock.

* * * * *